(12) United States Patent
Moyer (10) Patent No.: US 10,402,245 B2
(45) Date of Patent: Sep. 3, 2019

(54) WATCHDOG METHOD AND DEVICE

(71) Applicant: William C. Moyer, Dripping Springs, TX (US)

(72) Inventor: William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 837 days.

(21) Appl. No.: 14/504,702

(22) Filed: Oct. 2, 2014

(65) Prior Publication Data

US 2016/0098313 A1 Apr. 7, 2016

(51) Int. Cl.
*G06F 11/00* (2006.01)
*G06F 11/07* (2006.01)
*G06F 9/50* (2006.01)

(52) U.S. Cl.
CPC ........ *G06F 11/0757* (2013.01); *G06F 9/5027* (2013.01); *G06F 11/0724* (2013.01)

(58) Field of Classification Search
CPC ............. G06F 11/0757; G06F 11/0724; G06F 11/0793
See application file for complete search history.

(56) References Cited

U.S. PATENT DOCUMENTS

| 4,263,647 | A | * | 4/1981 | Merrell | .............. | G05B 19/4063 |
| | | | | | | 700/169 |
| 5,623,357 | A | | 4/1997 | Kight et al. | | |
| 8,200,799 | B2 | | 6/2012 | Scheuermann et al. | | |
| 8,261,134 | B2 | | 9/2012 | Abts et al. | | |
| 8,281,022 | B1 | | 10/2012 | Bopardikar et al. | | |
| 2005/0188274 | A1 | | 8/2005 | Vedam et al. | | |
| 2012/0221884 | A1 | | 8/2012 | Carter et al. | | |
| 2014/0082434 | A1 | * | 3/2014 | Knight | ............... | G05B 19/0428 |
| | | | | | | 714/55 |

* cited by examiner

*Primary Examiner* — Bryce P Bonzo
*Assistant Examiner* — Katherine Lin (57) ABSTRACT

Each task assigned to a core can be considered an "active" task. Sequential strobe signals of a watchdog signal can be spaced apart in time by a certain duration. The duration between strobe signals is longer than the expected duration of an active task. By knowing that all tasks being monitored are expected to execute within an expected amount of time, the duration between the strobe signals can be set to be longer than that expected amount of time. If a task has not transitioned to inactive by a next strobe, a watchdog error has occurred.

19 Claims, 6 Drawing Sheets

| ACTIVITY INDICATOR | DESCRIPTION |
|---|---|
| 000 | TWSn IS ACTIVE WHEN A TASK IS ASSIGNED TO TASK_n [[MAY OR MAY NOT BE ASSIGNED TO CPU]]<br><br>TWSn IS INACTIVE WHEN NO TASK IS ASSIGNED TO TASK_n [[TASK COMPLETE]] |
| 001 | TWSn IS INACTIVE WHEN A TASK IS ASSIGNED TO TASK_n<br><br>TWSn IS INACTIVE WHEN TASK_n IS ENABLED FOR EXECUTION BY A CPU;<br><br>TWSn IS INACTIVE WHEN NO TASK IS ASSIGNED TO TASK_n [[EXECUTION BY CPU COMPLETE]] |
| 010 | TWSn IS INACTIVE WHEN A TASK IS ASSIGNED TO TASK_n;<br>TWSn IS ACTIVE WHEN TASK_n IS BEING EXECUTED BY CPU<br>TWSn IS INACTIVE WHEN NO TASK IS ASSIGNED TO TASK_n; |
| 011 | TWSn IS ACTIVE WHEN A TASK IS INITIALLY ASSIGNED TO TASK_n, WHICH INDICATES AN INITIAL JOB; [[ MAY OR MAY NOT BE ASSIGNED TO CPU]];<br><br>TWSn TRANSITIONS ACTIVE-INACTIVE-ACTIVE IN RESPONSE TO INDICATION OF NEXT JOB OF TASK;<br><br>TWSn IS INACTIVE WHEN NO TASK IS ASSIGNED TO TASK_n [[EXECUTION BY CPU IS COMPLETE]] |
| 110 | TWSn IS INACTIVE WHEN A TASK IS ASSIGNED TO TASK_n;<br><br>TWSn TRANSITIONS ACTIVE WHEN TASK_n IS ENABLED FOR EXECUTION BY CPU, WHICH INDICATES AN INITIAL JOB IS BEING EXECUTED;<br><br>TWSn TRANSITIONS ACTIVE-INACTIVE IN RESPONSE TO CURRENT JOB BEING COMPLETED BY CPU<br><br>TWSn TRANSITIONS INACTIVE-ACTIVE IN RESPONSE TO A NEXT JOB OF THE TASK BEING ENABLED FOR EXECUTION BY THE CPU; |
| 111 | TWSn IS INACTIVE WHEN A TASK IS ASSIGNED TO TASK_n;<br><br>TWSn TRANSITIONS ACTIVE WHEN TASK_n IS BEING EXECUTED BY CPU, WHICH INDICATES A CURRENT JOB IS BEING EXECUTED;<br><br>TWSn TRANSITIONS ACTIVE-INACTIVE IN RESPONSE TO EXECUTION CURRENT JOB OF TASK BEING COMPLETED; [[INCLUDES TASK_n BEING UNASSIGNED]]<br><br>TWSn TRANSITIONS INACTIVE-ACTIVE IN RESPONSE TO CPU EXECUTING A NEXT JOB OF THE TASK; |

| ACTIVITY INDICATOR | DESCRIPTION |
| --- | --- |
| 000 | TWSn IS ACTIVE WHEN A TASK IS ASSIGNED TO TASK_n [[MAY OR MAY NOT BE ASSIGNED TO CPU]]<br><br>TWSn IS INACTIVE WHEN NO TASK IS ASSIGNED TO TASK_n [[TASK COMPLETE]] |
| 001 | TWSn IS INACTIVE WHEN A TASK IS ASSIGNED TO TASK_n<br><br>TWSn IS INACTIVE WHEN TASK_n IS ENABLED FOR EXECUTION BY A CPU;<br><br>TWSn IS INACTIVE WHEN NO TASK IS ASSIGNED TO TASK_n [[EXECUTION BY CPU COMPLETE]] |
| 010 | TWSn IS INACTIVE WHEN A TASK IS ASSIGNED TO TASK_n;<br><br>TWSn IS ACTIVE WHEN TASK_n IS BEING EXECUTED BY CPU<br><br>TWSn IS INACTIVE WHEN NO TASK IS ASSIGNED TO TASK_n; |
| 011 | TWSn IS ACTIVE WHEN A TASK IS INITIALLY ASSIGNED TO TASK_n, WHICH INDICATES AN INITIAL JOB; [[ MAY OR MAY NOT BE ASSIGNED TO CPU]];<br><br>TWSn TRANSITIONS ACTIVE-INACTIVE-ACTIVE IN RESPONSE TO INDICATION OF NEXT JOB OF TASK;<br><br>TWSn IS INACTIVE WHEN NO TASK IS ASSIGNED TO TASK_n [[EXECUTION BY CPU IS COMPLETE]] |
| 110 | TWSn IS INACTIVE WHEN A TASK IS ASSIGNED TO TASK_n;<br><br>TWSn TRANSITIONS ACTIVE WHEN TASK_n IS ENABLED FOR EXECUTION BY CPU, WHICH INDICATES AN INITIAL JOB IS BEING EXECUTED;<br><br>TWSn TRANSITIONS ACTIVE-INACTIVE IN RESPONSE TO CURRENT JOB BEING COMPLETED BY CPU<br><br>TWSn TRANSITIONS INACTIVE-ACTIVE IN RESPONSE TO A NEXT JOB OF THE TASK BEING ENABLED FOR EXECUTION BY THE CPU; |
| 111 | TWSn IS INACTIVE WHEN A TASK IS ASSIGNED TO TASK_n;<br><br>TWSn TRANSITIONS ACTIVE WHEN TASK_n IS BEING EXECUTED BY CPU, WHICH INDICATES A CURRENT JOB IS BEING EXECUTED;<br><br>TWSn TRANSITIONS ACTIVE-INACTIVE IN RESPONSE TO EXECUTION CURRENT JOB OF TASK BEING COMPLETED; [[INCLUDES TASK_n BEING UNASSIGNED]]<br><br>TWSn TRANSITIONS INACTIVE-ACTIVE IN RESPONSE TO CPU EXECUTING A NEXT JOB OF THE TASK; |

WATCHDOG METHOD AND DEVICE

BACKGROUND

Field of the Disclosure

This matter deals generally with devices and methods using electronic devices, and more particular to devices and method using electronic devices with watchdog capabilities.

Related Art

Generally, data processing systems operate to execute program instructions to perform various data processing operations. As such, a particular core of a data processing system can be assigned to execute a program that processes a particular set of data. This combination of a program and corresponding data represents a specific task that is to be executed by the data processing system, and in particular, once assigned, this task represents a specific task of that core. Each core of a data processing system can be assigned multiple tasks.

A task is divided into one or more portions that are referred to as jobs. When a task has multiple jobs, each job represents an operation of the task that is performed without being interrupted by a task switch. A job can be executed by a core, a non-core resource, or a combination thereof. For example, a core executing a task program can transfer control of a particular job for the task to a hardware accelerator. Note that when control of a job is transferred to a non-core resource, the core that was executing the task program may no longer need to actively process the job. Thus, the core can be released from execution of the current task's job, and can be used to execute a job from another task. When the non-core resource is finished executing its assigned job, a next job of the original task can be scheduled for execution.

A core can implement a task switch, e.g., switch between tasks, on job boundaries, that is, after completion of one job and before starting a next job. For example, a task scheduler can determine the next job to assign to a core once it completes a current job. Task switching provides a benefit of enabling a core to execute multiple tasks in a time-sliced manner.

When switching between tasks, a core typically stores context information (e.g., state information) of its current task before exiting the current task. The process of saving a particular core's context information for an executing task, and loading stored context information associated with a next task to be processed by the core, is generally referred to as context or task switching.

The ability to determine if a particular task is operating properly can be monitored using a watchdog timer that is serviced by the particular task's software. For example, the particular task can be required to repeatedly set a counter to a particular value, before the counter reaches an error count. Otherwise, upon obtaining the error count, an error, referred to as a watchdog error, occurs.

BRIEF DESCRIPTION OF THE DRAWINGS

The present disclosure may be better understood, and its numerous features and advantages made apparent to those skilled in the art by referencing the accompanying drawings.

FIG. 6 illustrates, in tabular form, various embodiments for determining whether a particular task is active or inactive.

The use of the same reference symbols in different drawings indicates similar or identical items.

DETAILED DESCRIPTION OF THE DRAWINGS

A task-based data processor system is disclosed having one or more processor cores, and various other devices to support operation of the processor cores, and in particular, other devices to support execution of tasks. Such a system can, for example, include a work flow scheduler and a task ordering manager. As task data becomes available, the work scheduler of the processor determines a program (task program) that will process the task data, and assigns the program ID/task data combination to a task identifier (task ID) of a processor core, along with initial ordering information that is used by the core to determine when to execute the task, allowing execution of jobs of a task to be "ordered" with respect to execution of jobs of other tasks.

Processor cores wait to execute a particular task until the task is enabled, and until other ordering information indicates it is the particular task's turn to be executed. When a task is selected for execution, its processor core can begin executing the task program from an address associated with the task identifier, which, for a new task, can be included with the initial ordering information, e.g., the initial program instruction identifier that points to the beginning address of the task's program code.

Each task assigned to a core can be considered an "active" task. Sequential strobe signals of a watchdog signal are spaced apart in time by a duration that can be programmed. The duration between strobe signals is longer than the expected duration of an active task. For example, by knowing that all tasks being monitored are expected to execute within an expected amount of time, the duration between the strobe signals can be set to be longer than that expected amount of time. By doing so, each task that is active at one strobe will normally be inactive, e.g., completed, before the next sequential strobe—assuming expected operation. Otherwise, if a task has not transitioned to inactive by the next strobe point, a watchdog error has occurred. Various embodiments of the present disclosure will be better understood with reference to FIGS. 1-9.

Figure 1:
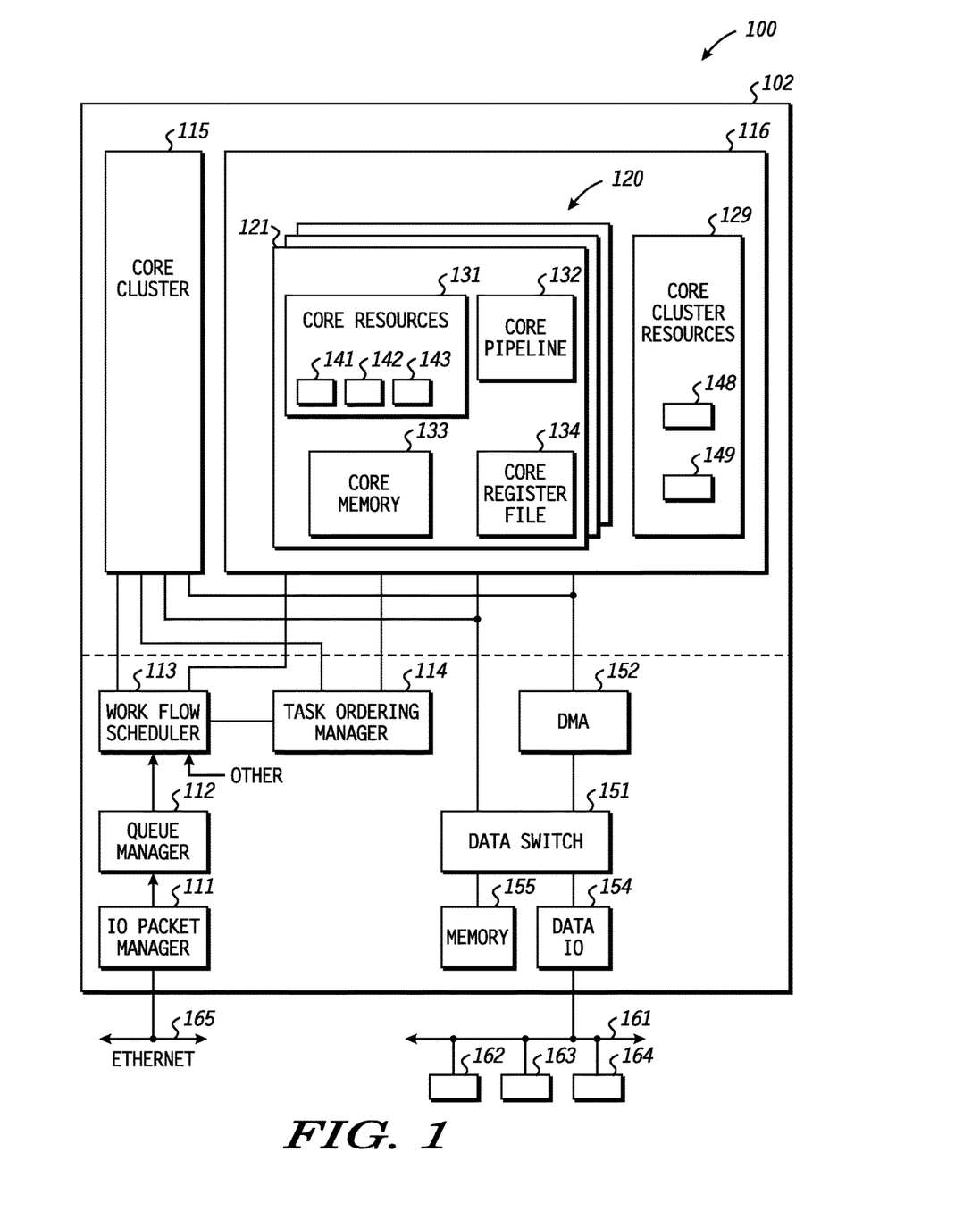
FIG. 1 illustrates, in block diagram form, the data processor system in accordance with a particular embodiment.

FIG. 1 shows a data processor system 100 of a device in accordance with at least one embodiment of the present disclosure. The data processor system 100 includes various circuit portions including a data processor 102 connected to devices 162-164 via an interconnect 161, and to an Ethernet network 165. According to a particular embodiment, the data processor 102 can be an integrated circuit device integrated at a monolithic substrate, such as at a semiconductor die, at a package having one or more such monolithic substrates, and the like.

It will be appreciated that the various interconnects disclosed herein are used to communicate information between various devices either directly or indirectly. For example, an interconnect can be implemented as a passive device, such as one or more conductive traces, that transmits information directly between various devices, or as an active device that buffers information being transmitted, e.g., the information is stored and retrieved in the processes of being communicated between devices, such as at a first-in first-out (FIFO) memory or other memory device. In addition, for convenience, a label associated with an interconnect or a signal can be used herein to refer to both the interconnect and the signal. For example, it can be stated that an interconnect labeled CK transmits a signal CK, or that a signal CK is transmitted via an interconnect CK.

Data processor 102 includes various circuit portions including an IO packet manager 111, such as a Wire Rate Input/Output Processor (WRIOP), a queue manager 112, a work flow scheduler 113, a task ordering manager 114, a processor core cluster 115, a processor core cluster 116, a data switch 151, a direct memory access (DMA) controller 152, a data I/O controller 154, and a memory 155. The memory 155 is a system resource of the data processor 102, and therefore is accessible by each of the core clusters 115 and 116.

The data processor core clusters 115 and 116 can be the same or different. For ease of discussion, it is presumed they are substantially the same. Therefore, for brevity, FIG. 1 illustrates only data processor core cluster 116 in detail, which is illustrated to include a plurality of processor cores 120, including processor core 121, and a core cluster resource 129 that includes resources that support each of the plurality of processor cores 120 of core cluster 116. While multiple core clusters are illustrated, it will be appreciated, that in other embodiments the data processor 102 can include a single core cluster, a single core, or a plurality of individual cores.

In an embodiment, the various features of processor 102, such as task ordering manager 114, workflow scheduler 113, and the cores 120, can be general purpose or special purpose processors such as state machines, instruction-based processors, other types of logic circuits capable of performing operations, and the like. By way of example, core 121 is presumed to be an instruction-based data processor core.

In operation, the processor 102 can communicate via interconnect 161 to devices 162-164. For example, one of devices 162-164 can be a system-level memory of data processor system 100. In addition, the processor 102 can receive and provide information packets, such as Ethernet packets, via interconnect 165. By way of example, various tasks are described herein in the context of packet processing. For example, the processor 102 can receive/send data packets, such as Ethernet data packets, from/to other devices via the circuitry labeled IO packet manager 111.

Received data packets are classified by the IO Packet manager 111 and provided to the queue manager 112, which in turn stores data packet information in a queue (not shown). During classification, the IO Packet manager 111 can evaluate header information of a received data packet to determine program code that is to process the received data packet, and associates a particular program identifier (program ID) of that program code to the data packet that identifies that program. Examples of various programs that can process a data packet include programs that perform decryption, de-compression, compression, and the like. The queue manager 112 can create/remove queues based on the number of packet streams received at the processor 102. Thus, upon being classified, a data packet can be assigned to an existing queue corresponding to a particular existing data stream, or to a newly created queue if the data packet is determined to be the initial data packet of a new data stream.

After a data packet is placed in a queue, the work flow scheduler 113 provides information to a particular core that associates a particular task ID to the data packet information (the task data) and to its corresponding processing program (the task program). Relevant information of each task can be provided to the task ordering manager 114, which maintains various task status information that can be used to determine which assigned tasks are enabled for execution by their corresponding core. For example, the workflow scheduler 113 can provide information to the task ordering manager 114 when a particular task has been assigned, e.g., data packet information and program information has been associated to a particular task. In addition, the core 121 can provide task information to the task ordering manager 114 that indicates which task, and job of the task (task/job), is currently executing, as well as other task state information. The task ordering manager 114 can use this information to determine which other tasks can be enabled for execution.

It will be appreciated that with respect to cores having a having a fixed number of Task IDs, that the term "task" as used herein can generally refer to either assigned or unassigned tasks. For example, the tasks of a core supporting a fixed number n of Task IDs, where n is an integer, are referred to herein as Task1-Taskn. A particular task, such as Task1, for example, is an unassigned task prior to being associated with a particular task data, e.g., data packet information, and a corresponding task program. Thus, Task1 becomes an assigned task once a particular data packet and task program become associated with Task1. Thus, an assigned task can be considered an existing task by virtue of being associated with a task data/program. Conversely, an unassigned task does not actually refer to an existing task by virtue of not associated with a task data/program. Thus, an unassigned task more precisely refers to a task identifier that is available to be assigned to a task data/program. In other core architectures that dynamically allocate task identifiers, the term task refers only to assigned tasks, as the concept of a Task ID being unassigned has no meaning.

During execution, a task can access memory 155 directly via data switch 151 by providing data switch 151 access information corresponding to memory 155. Alternatively, a task can access memory 155 indirectly via data switch 151 by configuring DMA 152 with access information corresponding to data switch 151. In a similar manner, a task can access external resources 162-164, which can include memory and other peripherals, directly via data switch 151 or indirectly via DMA 152.

Each of the plurality of cores 120 includes various circuit modules. For example, core 121 includes core resources 131, core pipeline 132, a core memory 133, and core register file 134. The core resources module 131 is illustrated to include module 141-143, that implement particular operations. For example, one of the modules 141-143 can be a core-level task watchdog device, as described in greater detail below, while another one of the modules 141-143 can be a core task manager that maintains various task information for the tasks of core 121.

The task information maintained by a core task manager can indicate a state of each task that can be used to control the manner in which tasks are executed relative to each other. For example, the core task manager of a core can include a task table that includes information represented at Table 1, which only illustrates entries for the assigned tasks. According to the embodiment of Table 1, core's task table includes initial assignment information that can be provided by workflow scheduler 113 when the task is created. For example, Table 1 illustrates processor core 121 with three assigned tasks, Task1, Task2, and Task3, as indicated by the task identifiers listed in the column labeled "Task".

TABLE 1

Task Table 132 for Processor Core 121 (Time T0)

| Task | Task Data | Inhibit | Job |
|---|---|---|---|
| Task1 | DP1 | 1 | J1, J2 |
| Task2 | DP2 | 1 | J4, J5 |
| Task3 | DP4 | 1 | J1, J2, J3 |

The column labeled "Task Data" includes an indicator that identifies a location of the task data to be processed each assigned task. The column labeled "Inhibit" includes an indicator that indicates whether an assigned task is enabled to be executed by its core. For example, an Inhibit indicator having a value of one (1) indicates that a corresponding task cannot be executed by its core at this point in time, while an Inhibit indicator having a value of zero (0) indicates that the corresponding task can be executed by its core at this time. The column labeled "Job" lists the jobs associated with a corresponding task. The first job of the list is an indicator that identifies a location where instructions reside for the next job to be executed, e.g., indicates from where task program instructions are to be fetched by the core when execution of a next job commences. Note, according to Table 1, no jobs have been completed, and therefore none of the Job indicators are struck-through.

A task can include one or more jobs. The jobs of a task can be defined by task program code based upon the understanding of a programmer or compiler as to the resources used by particular portions of the task program during execution. Once identified, the job boundaries of a task can be indicated in the task program itself through the use of task switch instructions that identifies not only the location where a task switch can occur, but a next job as well. For example, referring to Table 1, the last instruction of job J1 of Task0 could be <TaskSwitch J2>, which is a task switch instruction having an operand J2 that identifies the beginning of job J2 of Task0. Thus, neither the processor core executing a task, nor the task ordering manager need to have a priori knowledge as to the identity of a task's jobs.

According to Table 1, the current state of the core is such that none of TASK1-TASK3 are enabled for execution as indicated by their respective inhibit indicators having a value of one (1). Once enabled and executed, Task1 will process task data associated with identifier DP1 (task data DP1) by executing the initial job J1, as listed in the Job column of Table 1. Similarly, when executed, Task2 will process task data DP2 by executing task job J4 followed by executing task job J5, and Task3 will process task data DP4 by executing job J1 at core 132, followed by job J2, and then job J3.

The core memory 133 can be accessed by the various tasks executed by the core pipeline 132. The core memory 133 of each core can be implemented as memory element that is separate from the memory element of each other core, or can be implemented at a larger multiport memory that supports multiple core memories. The core register file 134 can include storage locations that are directly accessible by the core pipeline 132, and other resources of core 121.

The core cluster resources module 129, of core clusters 116, can include a plurality of circuit modules, including modules 146-147, that support each core of the plurality of cores 120. For example, one of the modules 146-147 can be a cluster-level task watchdog module as described in greater detail with respect to FIG. 8 below.

Figure 2:
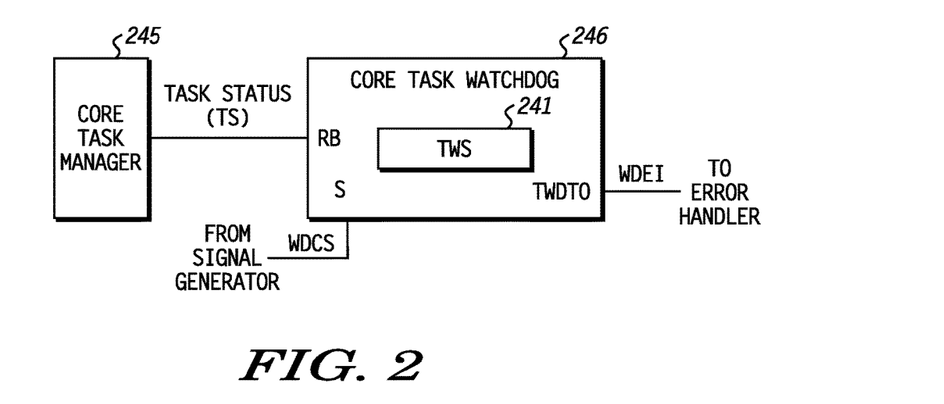
FIG. 2 illustrates, in block diagram form, a portion of the data processing system of FIG. 1 in accordance with a particular embodiment.

FIG. 2 illustrates a core task manager 245 and a core task watchdog 246, each of which can correspond respectively to one of the portions 141-143 of the core resources 131.

The core task manager 245 is connected to a reset input node (RB) of the core task watchdog 246 via an interconnect labeled TASK STATUS (TS). An interconnect labeled "WDCS" (WatchDog Check Signal) is connected to an input node of the core task watchdog 246 labeled "S". An output node of the core task watchdog 246 labeled "TWDTO" (Task WatchDog Time Out) is connected to an interconnect labeled "WDEI" (WatchDog Error Indicator) that is connected to an error handler (not shown). Core task watchdog 246 further includes a register 241 labeled "TWS" (Task Watchdog Status) having n-bits, where n is an integer representing the number of tasks associated with the core task manager 121. Therefore, if core task manager can handle up to 16 tasks, the register TWS would have sixteen bits TWS[1]-TWS[16]. By way of example, it is presumed core 121 supports 16 tasks (Task1-Task16).

During operation, the core task manager 245 provides a task state indicator (TS) to the input RB of the core task watchdog 246. The indicator TS includes information that indicates whether each one of Task1-Task16 is an active or inactive task. By way of example, interconnect TS is presumed to be a 16-node data bus, wherein each node of the data bus corresponds to one of Task1-Task16. By way of example, it is presumed that the node TS[1] transmits a binary task state indicator, also referred to as TS[1], that when asserted indicates that Task1 is active, and when negated indicates that Task1 is inactive. As will be discussed in greater detail below, the input node RB is a level-sensitive input node of the core task watchdog 246 that, in response to one of the TS nodes transitioning from logic-one to logic-zero, causes a corresponding bit of the TWS register to be negated. Thus, if signal TS[1] transitions from a logic-one to a logic-zero, e.g., from Vdd to ground, Bit TWS[1] of the TWS register will be negated.

The watchdog check signal (WDCS) received at input S of the core test watchdog 246 can be interpreted by the core task watchdog 246 as either asserted or negated. By way of example, it is presumed that input S of core task watchdog 246 is an edge-sensitive input that interprets only rising edges as asserted signals. By way of example, it is presumed that task watchdog 246 will interpret WDCS as asserted in response to WDCS transitioning from a logic-low to a logic-high. For ease of discussion, it is further presumed that each rising edge of WDCS corresponds to a short signal pulse referred to as a "strobe" that can occur periodically or aperiodically. As will be discussed in greater detail below, the duration between WDCS strobes is selected to be longer than the expected duration of an active state of any task being monitored by the core task watchdog 246. Thus, if the maximum amount of time that any monitored task is expected to be active is represented by X, the duration between the WDCS strobes is selected to be greater than X.

The duration of the WDCS strobes can be user programmable as will be described in greater detail herein.

During expected operation, e.g., no watchdog violations have occurred, reception of a WDCS strobe at input S, will result in each bit of register TWS corresponding to an active task being asserted. For example, in response to the WDCS strobe, each bit of TWS corresponding to a currently active task will be asserted, after-which any input node RB[x] that is negated will cause its corresponding TWS bit to be negate. As a result, only those TWS bits corresponding to active tasks will remain asserted. For example, bit TWS[1] will remain asserted after the WDCS strobe being negated in response to its corresponding task status bit being asserted (TS[1]=1). Conversely, bit TWS[1] will be negated immediately after the WDCS strobe being asserted in response to its corresponding task status bit being negated (TS[1]=0). It will be appreciated, that because input RB is level-sensitive, whenever an active task transitions active-inactive (TS[1] =1→0), the corresponding bit of register TWS will also be negated. Conversely, because the input RB is an active-low signal, the assertion of a TS bit, indicating a task has transitioned from inactive to active, has no affect on the TWS register when WDCS is negated.

Because the duration between sequential WDCS strobes is selected to be greater than the amount of time any task is expected to be active, each bit of the TWS register is expected to be cleared (TWS=0) prior to the occurrence of the latter WDCS. However, in the event an active task does not transition to inactive prior to the next WDCS strobe, which is referred to herein as unexpected operation, a bit of the TWS register corresponding to the task will remain asserted (TWS< >0) at the time the next strobe, thereby, indicating a watchdog error has occurred for the corresponding task (a task watchdog error). In response to the occurrence of a task watchdog error, the core task watchdog 246 will assert the EI signal to enable error processing by an exception handler.

Figure 3:
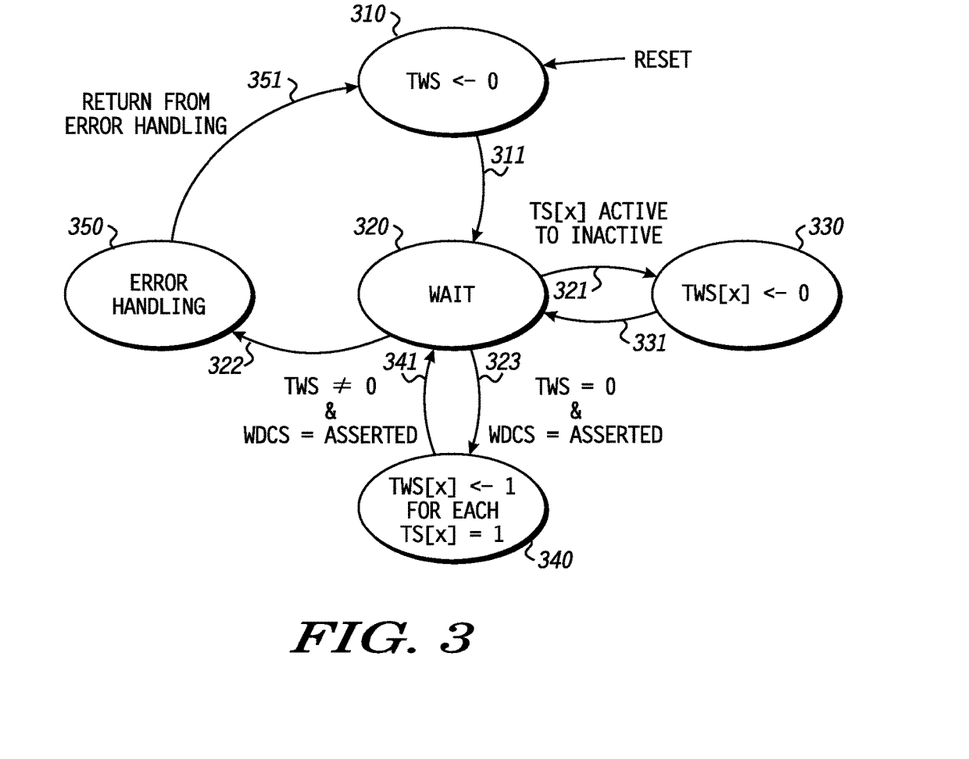
FIG. 3 illustrates, in state diagram form, operational information of the core task watchdog of FIG. 2 in accordance with a particular embodiment.

FIG. 3 illustrates a state diagram 300 representative of the operation of the court task watchdog 246 in accordance with a particular embodiment. The state diagram 300 includes nodes 310, 320, 330, 340, and 350 (nodes 310-350). Operational flow begins at node 310 upon reset of the core, where each value of the TWS register is cleared, before proceeding to node 320 as indicated by transition flow indicator 311.

Operation remains at node 320 until an initial WDCS strobe, at which time flow proceeds to node 340 as indicated by transition flow indicator 323 by virtue of all TWS bits being negated (TWS=0).

At node 340, each TS bit (TS[x]) is evaluated to determine if it is asserted or negated. When asserted, the TWS[x] bit corresponding to each asserted TS[s] bit is asserted to indicate Taskx is active. Otherwise, the TWS[x] bit remains negated to indicate Taskx is inactive. It will be appreciated, that the operation described at node 340 can include multiple operations. For example, at node 340 the TWS bits associated with inactive tasks can be initially asserted in response to the strobe, and then immediately negated. Flow proceeds from node 340 back to node 320 to wait for a next strobe.

In response to a task transitioning from active to inactive, TS[x]=1→0, flow proceeds via node transition indicator 321 to node 330. At node 330, the TWS bit corresponding to the now inactive task is negated, and flow returns via node transition indicator 331 to node 320. In this manner, as each active task becomes inactive, its corresponding TWS bit will be negated.

If at the next WDCS strobe, the register TWS is equal to zero, the core's operation is as expected and flow proceeds to node 340 via node transition indicator 323, and each bit of TWS corresponding to an active task is asserted as previously described. Otherwise, if at the next WDCS strobe the register TWS is not equal to zero, a watchdog error has occurred and flow proceeds to node 350 via node transition indicator 322.

At node 350, error handling of the watchdog error occurs. Such error handling can be the result of an exception, such as a vector interrupt, non-vector interrupt handling, a reset, the like, and combinations thereof. Once error processing is completed, flow transitions to node 310 via node transition indicator 351.

Figure 4:
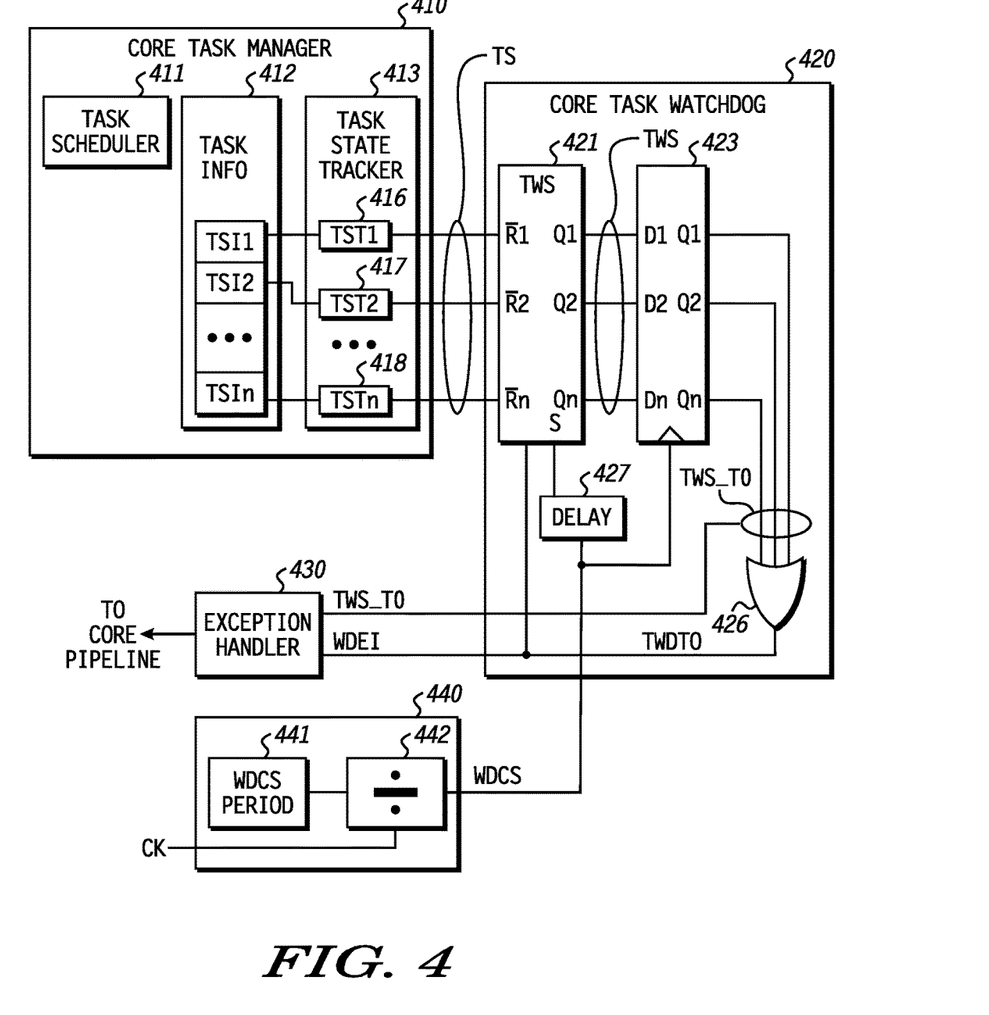
FIG. 4 illustrates, in block diagram form, a more detailed embodiment of portions of the data processor of FIG. 1.

FIG. 4 illustrates a core task manager 410 and a core task watchdog 420, which can be particular embodiments of the core task manager 245 and of the core task watchdog 246 of FIG. 2, respectively. In addition, FIG. 4 illustrates an exception handler 430, and a WDCS generation circuit 440.

The WDCS generation circuit includes a storage location 441, which can be a register location, that stores a value that is accessed by divider circuit 442 to generate WDCS strobes, based on clock signal CK, at a specific intervals, wherein the intervals result in a desired duration between WDCS strobes. The value stored at storage location 441, can be chosen to result in duration between WDCS strobes that is longer than the expected duration of any task being monitored by the core task watchdog 420. The storage location can be programmable. In an embodiment, the storage location can be programmable only by a specific resource, such as a specific core or task. Such a specific core can be fixed in hardware, or programmable.

The core task manager 245 includes a task scheduler 411, Task Info storage locations (task info 412), and task state tracker 416. The core task watchdog 420 includes a latch 421, a latch 423, OR-gate 426, and a delay circuit 427.

The task scheduler 411 can correspond to one of the core resources 141-143 (FIG. 1), and operates to control execution order of its local tasks. The task scheduler 411 can monitor and update various task information 412 that is indicative of a particular operating state of each task. For example, task information 412 includes information TSI1 that corresponds to information pertinent to the operating state of Task1. Thus, the information TSI1 can be used by the task scheduler 411 to determine the current state of Task1. This information can be used by the task scheduler to determine the order that Task1 should be executed relative to other tasks. It will be appreciated, that the task information 412 can be updated by the task scheduler 411 as tasks are enabled.

The task state tracker 413 includes task state tracker circuitry (TST1-TSTn) that corresponds to each one of the core's tasks. Therefore, circuitry TST1 is connected to the task information 412 to determine, based upon the TSI1 information, whether Task1 is active or inactive. If active, a corresponding bit TS[1] is asserted, otherwise, TS[1] is negated. In this manner, an active/inactive state of each task is determined.

The signal TS is provided to input nodes RB1-RBn of latch 421. Latch 421 outputs Q1-Qn correspond to the TWS register, described previously, and are connected to input nodes D1-Dn of the D Flip-Flop 423. The outputs Q1-Qn of the D flip-flop 423 are connected to corresponding inputs of an OR-gate 426 and can correspond to a register TWS_T0. An output of the OR-gate 426 is connected to interconnect TWDTO and to exception handler 430, where the interconnect is labeled WDEI, by virtue of being external to the core task watchdog 420.

During expected operation, when all outputs of latch 421 are negated upon receipt of a WDCS strobe, the output of OR-gate 426 is negated, which enables operation of the latch 421. Receipt of the next WDCS strobe causes register TWS_T0, e.g., D flip-flop 423, to latch the value stored at the TWS register, e.g., latch 421, at a time T0. This information now latched at register TWS_T0 is provided to OR-gate 426, which will maintain the negated value at interconnect TWDTO by virtue of the operation being as expected. The WDCS strobe is delayed a sufficient amount time by delay circuit WDCS to allow OR-gate 426 the ability to disable latch 421 before new task status data is latched by the WDCS strobe in the event non-expected operation were to occur. Thus, during expected operation, the WDCS strobe is provided to latch 421 causing each output node to be asserted, at least temporarily, by virtue of a rising-edge at input S of latch 421.

Because S is edge sensitive, only those outputs Q1-Qn that are associated with active tasks will remain asserted. For example, when TS[1] is asserted, Task1 is active, and output Q1 will remain asserted. However, when TS[1] is negated, Task1 is inactive, and output Q1 will become negated immediately.

Thus, because the time interval between assertions of WDCS is selected to be longer than tasks are expected to be active, during expected operation each asserted output of the latch 421 will be negated prior to occurrence of next WDCS strobe. Conversely, when operation does not proceed as expected, e.g., a task remains active for the entire duration between WDCS strobes, at least one of the outputs of latch 421 will remain asserted at the receipt of the next WDCS strobe. As a result, a non-zero value will be latched at D flip-flow 423 causing the OR-gate 426 to assert the signal TWDTO to indicate the occurrence of the watchdog error.

In response to the asserted TWDTO signal, the latch 421 is disabled, prior to receipt of the current WDCS strobe, and the exception handler 430 latches in the information TWS_T0, which can be used to determine which task is associated with the watchdog error.

Figure 5:
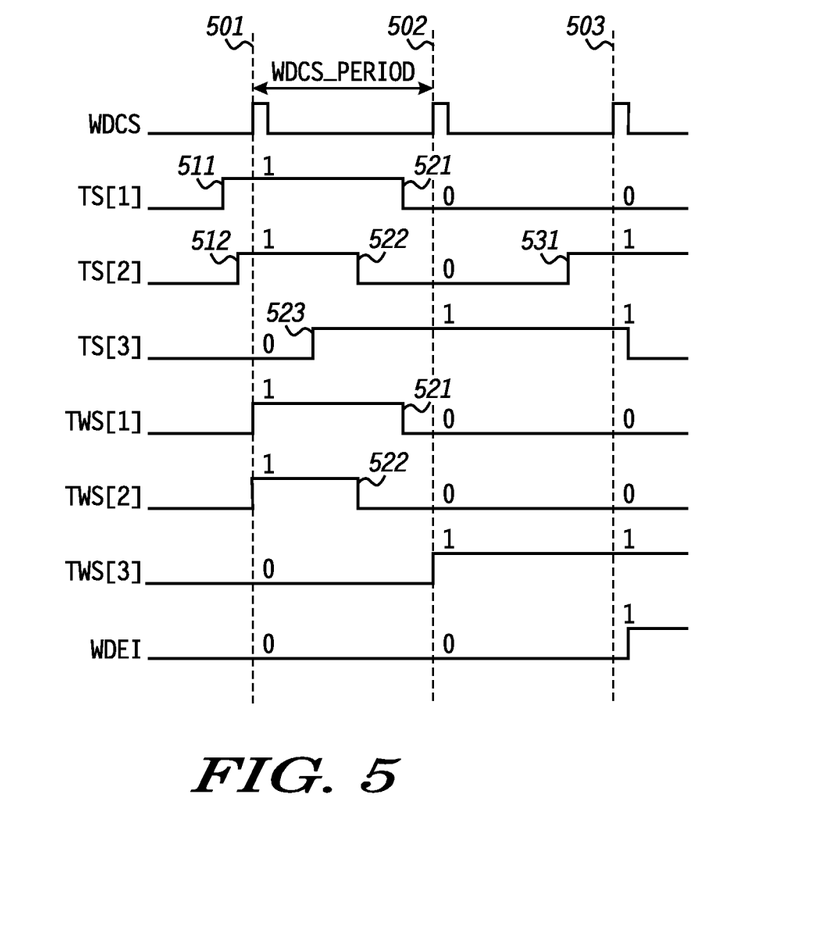
FIG. 5 illustrates, in timing diagram form, state information for various portions of the processor system of FIG. 1 in accordance with a particular embodiment.
Figure 7:
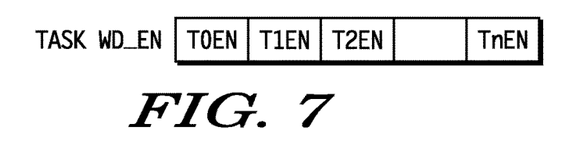
FIG. 7 illustrates, in block diagram form, a register that can store an identifier that indicates a manner in which it is determined whether a task is active or inactive.

FIG. 5 illustrates a timing diagram corresponding to the system of FIG. 4 in accordance a particular embodiment of the present disclosure. In particular, FIG. 5 includes waveforms corresponding to: WDCS;TS[1]-TS[3], which are initially negated to indicate Task1-Task3 are inactive; register values TWS[1]-TWS[3], which are initially negated; and TWDTO to indicate no watchdog error is detected. By way of example, it is presumed that only tasks Task1-Task3 are used by the system.

At time 511 signal TS[1] is asserted to indicate Task1 has become active. At time 512 signal TS[2] is asserted to indicate Task 2 has become active. As a result of a WDCS strobe at time 501, register bits TWS[1] and TWS[2] are asserted to indicate Task1 and Task 2 are active at time 501, and register bit TWS[3] is negated to indicate Task3 is inactive at time 501. Also at time 501, the signal TWDTO remains negated to indicate that as of time 501 no watchdog error has been detected.

At time 523, signal TS[3] is asserted to indicate Task3 has become active. Note, however, that register bit TWS[3] is not updated at time 523 as register TWS is only updated in response to WDCS strobes, and therefore assertion of TS[3] at time 523 has no effect on the TWS register.

At time 522, TS[2] is negated to indicate Task2 is no longer active, e.g., TS[2] has become inactive. As a result, bit TWS[2], which corresponds to Task2, is also negated at time 522, where it remains, at least until the next WDCS strobe. Similarly, at time 521, TS[1] is negated to indicate Task1 has become inactive. As a result, bit TWS[1], which corresponds to Task1, is also shown as having become negated at time 521.

At time 502, the next WDCS strobe occurs. Because each of register bits TWS[1]-TWS[3] are negated at time 502, which indicates that all tasks that were active at the previous WDCS strobe (time 501) became inactive prior to the WDCS strobe at time 502, the watchdog indicator TWDTO remains negated to indicate that no watchdog error has occurred. Also in response to there being no watchdog error (i.e., TWDTO is negated), the TWS register bits are updated to indicate Task3 is active at time 502, and that Task1 and Task2 are inactive. Note that the TWS register is updated asynchronously to the WDCS strobes in response to task indicators TS[1], TS[2], etc. transitioning active-inactive. Conversely, the TWS register is updated synchronously to the WDCS strobes in response to the task indicator transitioning inactive-active. Thus, had Task3 transitioned inactive-active-inactive between time 501 and time 502 a value of zero (0) would have been latched at the TWS register in response to the strobe at time 502.

At time 531, TS[2] is asserted to indicate that Task2 has become active.

At time 503, a next WDCS strobe occurs. Because register bit TWS[3] remains asserted at time 503, which indicates that Task3 did not transition to inactive between time 502 and 503, the watchdog error indicator TWDTO is asserted. The system remains in this state until the watchdog error has been addressed.

It will be appreciated that the watchdog mechanism disclosed herein does not require any maintenance by the task program. Thus, a specific task program does not have a priori knowledge of the watchdog mechanism. This differs from other watchdog mechanisms that requires each task program to service the watchdog mechanism in a particular manner. For example, the task program may be required to reset a counter at a specific storage location prior to the counter reaching predefined value to prevent a watchdog error. Removing the software overhead of each task having to service a traditional watchdog timer provides for more performance and processing cycles to be available, especially for tasks that are short term tasks. In addition, the watchdog mechanism disclosed herein is advantageous in that multiple tasks share a single common watchdog resource. For example, only one WDCS strobe need be generated, and one set of core task watchdog circuitry is needed to monitor multiple tasks of a single core, or multiple tasks from multiple cores. Furthermore, it will be appreciated that the TWS register may be write accessible only by the core task watchdog 420, and therefore is not accessible, or read-only accessible by program code executed at the various instruction pipelines of the cores.

Whether a particular task is active or inactive can be based upon fixed or user programmable criteria. FIG. 6 illustrates a table that lists a plurality of different criteria that can be used to determine whether a particular task is active or inactive. The first column of the table of FIG. 6, labeled Activity Indicator, lists a binary identifier that can be programmed by a user into a register field to indicate a particular criteria to be used to determine whether a task is active or inactive. Alternatively, it will be appreciated, that any one of the listed criteria, as well as others, may be predetermined in a fixed manner, e.g., not selectable.

When the binary identifier '000' is selected, a task is considered active when it is been assigned to a particular core, and remains active so long as that task remains assigned to the core. For example, when the workflow scheduler 113 (FIG. 1) assigns a task to task identifier Task1 of core 121, Task1 of core 121 is said to be active. Once execution of the task completes, e.g., no longer assigned to a particular Task ID, it is considered inactive. Prior to being assigned a task, Task1 is said to be inactive.

When the binary identifier '001' is selected, a task is considered active when an assigned task has been enabled for execution by its core, e.g., its Inhibit bit (Table 1) is negated, and is considered inactive when it is not enabled for execution by its core. Thus, an assigned task that is not yet enabled for execution by its core will remain inactive, and an active task that transitions from being enabled to being not enabled for execution will transition from being active to be inactive. According to a particular embodiment, the task ordering manager determines whether an assigned task is enabled for execution based upon other system considerations, such as the operational state of other tasks being executed.

When the binary identifier '010' is selected, a task is considered inactive until its core actually begins its execution. Once a task's execution begins, the task remains active until execution of the entire task is completed. Thus, a task that is assigned and enabled will be considered inactive until execution of its initial job begins, and will remain active until the last job of the task is completed. Thus, the task will remain active continuously once it becomes active even if the core stops execution of the task, for example due to a task switch.

When the binary identifier '011' is selected, a task is considered active when its core begins execution of an initial or next job of the task, and will be considered inactive when execution of the particular job is completed. Thus, a task that is assigned and enabled will be considered inactive until execution of its initial job begins, and will remain active until execution of the job is completed. Thus, the task will alternate between active and inactive when execution of one job is completed and execution of a next sequential job begins.

When the binary identifier '110' is selected, a task is considered inactive until it is enabled for execution by its core. Once enabled for execution, the task remains active until execution of a current job is completed. In the event sequential jobs of a task are executed consecutively by a core, the task will transition from active to inactive and back to active (active-inactive-active). In the event a task switch occurs at the completion of the current job, assuming the current job is not the task's last job, the current task transitions active-inactive-active so long as the core is enabled to execute the task's next job. Otherwise, the task will transition active-inactive so long as the core not enabled to execute the task's next job. Thus, the task will alternate between active and inactive as individual jobs of the task are completed and become available for execution.

When the binary identifier '111' is selected, a task is considered inactive prior to the execution of one of its jobs. Once execution of a job begins, the task remains active until execution of that job completes. In the event sequential jobs of a task are executed consecutively by a core, the task will transition active-inactive-active. In the event a task switch occurs at the completion of the current job of a task that is not the task's last job, the task transitions active-inactive where it remains until execution of the next job begins. Thus, the task will alternate between active and inactive as individual jobs of the task are completed. It will be appreciated, that there can be many other variations as to when a task is considered active or inactive.

According to a particular embodiment of the present disclosure, the watchdog device disclosed herein can be utilized on a task-by-task basis based upon a user programmable storage location. For example, referring to FIG. 7, a storage location labeled TASKWD_EN, which can be a register of the task watchdog 246, has a plurality of fields TlEN-TnEN that are associated with a corresponding plurality of tasks Task1-Taskn, and are asserted or negated to indicate whether their corresponding tasks are to be monitored by the watchdog 246. For example, field T0EN can correspond to Task1 of a particular core, and is programmed by a user to be asserted when Task1 is to be monitored by the watchdog mechanism, and is programmed to be negated when Task1 is not to be monitored by the watchdog mechanism. Similarly, multiple WDCS strobes can be generated, and a register having a field corresponding to each task could indicate which one of a plurality of WDCS strobes should be used by each corresponding task.

Figure 8:
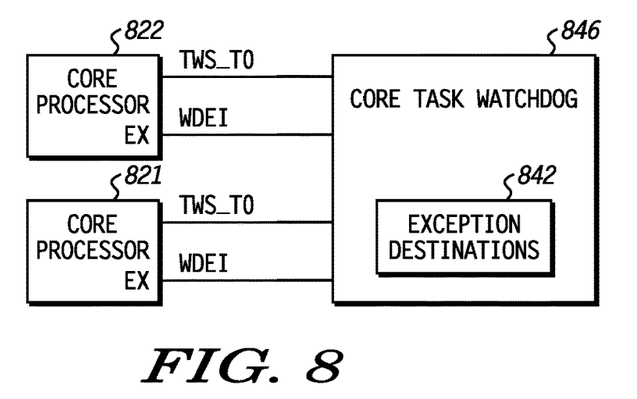
FIG. 8 illustrates, in block diagram form, a core task watchdog in accordance a particular embodiment of the present disclosure.

In the foregoing specification, the invention has been described with reference to specific examples of embodiments of the invention. It will, however, be evident that various modifications and changes may be made therein without departing from the broader spirit and scope of the invention as set forth in the appended claims. For example, in the above discussion, the core test watchdog 246 was described as being one of the core resources 141-143 of core 121. As such, each one of the plurality of cores 120 would have a corresponding task watchdog. In an alternate embodiment however, as illustrated in FIG. 8, the core task watchdog circuitry 846 can be a core cluster resource, such as one of the resources 146-147 (FIG. 1), that services each one of the cluster's cores. In such a configuration, the core task watchdog 846 would monitor the tasks of the plurality of cores of the core cluster 116. For example, if a cluster had four cores, the core task watchdog would be able to monitor a total of 64 tasks (16 for each core). Thus, the core task watchdog 846 monitors tasks that are assigned to different cores of a data processor.

In addition, FIG. 8 illustrates a register 842, which can include information that indicates to where information related to a watchdog error is to be provided in the event of a watchdog error. The information can identify a particular core, a particular address location, a particular vector location, and the like. For example, the information can identify a specific core of the core cluster 116 that is to receive a specific exception, via interconnects WDEI and TWS_T0, in response to a watchdog error occurring. This information is used by the selected core to process the watchdog error.

Figure 9:
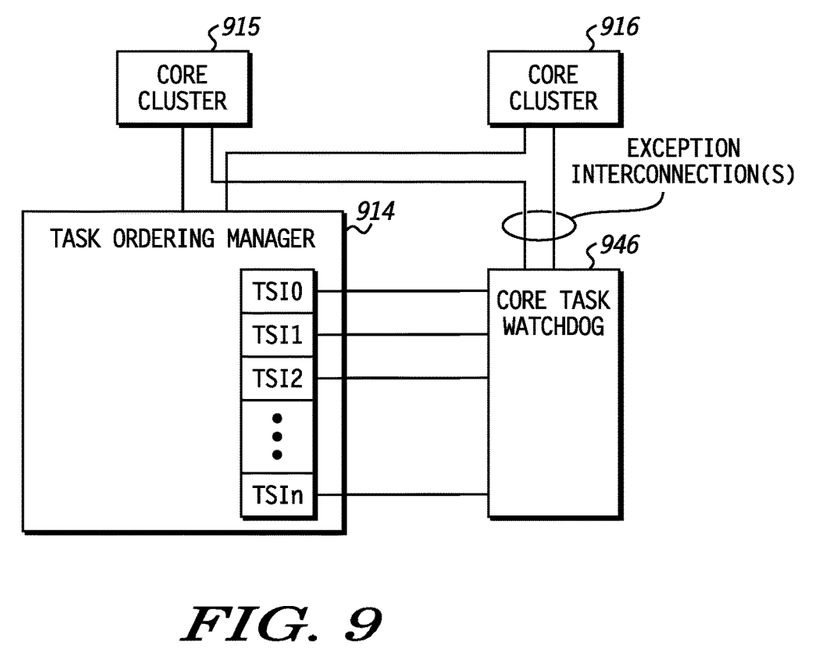
FIG. 9 illustrates, in block diagram form, a core task watchdog in accordance with a particular embodiment of the present disclosure.

FIG. 9 illustrates an alternate embodiment having a core task watchdog 946 that is a global resource for each core cluster, and, therefore, interfaces with each one of the core clusters 915 and 916, and with the task ordering manager 914 to monitor tasks from multiple core clusters. In the illustrated example, the task state information TSI0-TSIn that is used to determine whether a particular task is active or inactive is maintained at the task ordering manager 914, which can be a particular embodiment of the task ordering manager 114 (FIG. 1), and therefore is a global resource of both core clusters 915 and 916. For example, in the particular embodiment, the task ordering manager 914 maintains, or determines, the information necessary to determine if a particular task is active or inactive. An example of such information would be information that indicates whether each task has been assigned, enabled, is the next task scheduled for execution, and the like. This information can be used by the core task watchdog 946 without having to access the cores of the core clusters individually. Exception information that needs to be communicated to the individual cores in response to a watchdog error can be communicated via the exception interconnects.

In addition to these variations, it will be appreciated that many other variations can be envisioned. For example, the connections described herein may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples. For example, the tasks do not have to be packetized tasks, e.g., tasks associated with a specific packet. Furthermore, the devices may be physically distributed over a number of apparatuses, while functionally operating as a single device. Also, devices functionally forming.

In a first aspect, a method can include in response to a watchdog check signal being asserted at a first time, storing a first indicator that indicates a state of a first task of a data processor at the first time, and in response to the watchdog check signal being asserted at the first time, storing a second indicator that indicates a state of a second task of the data processor at the first time. The method can also include determining, based on the first and second indicators at a second time, whether at least one of the first or second task has been active since the first time, and in response to determining that at least one of the first or second task has been active since the first time active, asserting an error indicator.

In one embodiment of the first aspect, the method includes determining whether at least one of the first or second task has been active since the first time is in response to the watchdog check signal being asserted at the second time. In another embodiment, the watchdog check signal is asserted periodically. In a particular embodiment, the method includes programming a period of the watchdog timer from a task other than the first or second task.

In another embodiment of the first aspect, the first and second task are assigned to a same core of the data processor. In a further embodiment, the first and second task are assigned to different cores of the data processor. In yet another embodiment, the first indicator indicates the state of the first task is active at the first time, and independent of a state of the watchdog check signal, updating the first indicator to indicate the state of the first state is inactive in response to the state of the first task becoming inactive subsequent to the first time and prior to the second time. In yet a further embodiment, the method includes in response to determining that neither the state of the first nor second task is active at the second time, not asserting the error indictor. In a particular embodiment, the method includes in response to determining that neither the first nor second task is active, updating, in response to the watchdog check signal being asserted at the second time, the first state indicator to indicate whether the state of the first task at the second time is active or inactive, and updating the second state indicator to indicate whether the state of the second task at the second time is active or inactive.

In a further embodiment of the first aspect, each task of a plurality of tasks, which includes the first task and the second task, is active in response to being assigned to a particular core of the data processor. In another embodiment, the first indicator is stored at a first storage location, and a core executing the first task cannot write an indicator to the first storage location that indicates the first task is inactive. In a further embodiment, the first indicator is stored at a first storage location, the second indicator is stored at a second storage location, and a core executing the first task cannot store a value to either the first or second storage locations. In yet another embodiment, the error indicator is further asserted in response to a watchdog function being enabled.

In a second aspect, a data processor device can include a task scheduler configured to assign a plurality of tasks to a corresponding plurality of task identifiers, and a task state tracker configured to generate a state indicator for each one of the plurality of tasks that indicates whether a task is active or inactive. The device can also include a watchdog status register having a plurality of storage locations, each storage location to store a task identifier of a corresponding one of the plurality of tasks, a watchdog check circuit configured to generate a watchdog check signal that is periodically asserted, watchdog monitor circuit, coupled to the watchdog status register, to the watchdog check circuit, and to the task state tracker, that is configured to assert each storage location of the plurality of storage locations corresponding to a task having an active state indicator at the time the check signal is asserted, and to negate each storage location of the plurality of storage locations corresponding to a task having an inactive state indicator at the time the check signal is asserted, and error detect circuitry, coupled the watchdog status register and to the watchdog check circuit, configured to generate a watchdog error in response one or more of the plurality of storage locations being asserted at the time the check signal is asserted.

In one embodiment of the second aspect, the watchdog monitor circuit configures each storage location in response to a watchdog error not being generated by the error detect circuitry. In another embodiment, the device includes a plurality of cores including a first core and a second core, a first portion of the plurality of tasks assigned to the first core, and a second portion of the plurality of tasks assigned to the second core. In a further embodiment, the device includes a programmable check signal register coupled to the watchdog check circuit to indicate a period of the check signal to be implemented by the watchdog check circuit. In yet another embodiment, the task state tracker generates a state indicator that indicates a task is active synchronously with the check signal being asserted, and generates a state indicator that indicate a task is inactive asynchronously with the check signal.

In a third aspect, a method can include in response to receiving an asserted watchdog check signal at a first time, storing a first indicator at a first storage location that indicates the first task of a data processor is active at the first time, receiving a negated watchdog check signal at a second time that is contiguous to, and after, the first time, and in response to the watchdog check signal being asserted at a third time that is contiguous to, and after, the second time, asserting a watchdog error indicator in response to determining that the first indicator is stored at the first storage location.

In one embodiment of the third aspect, the method includes storing a duration indicator, and asserting the second watchdog check signal at the third time relative to the first time based upon the stored duration indicator.

What is claimed is:

1. A method comprising:
   in response to a watchdog check signal being asserted at a first time, storing a first indicator that indicates a state of a first task of a data processor as active or inactive at the first time;
   in response to the watchdog check signal being asserted at the first time, storing a second indicator that indicates a state of a second task of the data processor as active or inactive at the first time;
   determining, based on the first and second indicators at a second time, whether at least one of the first or second task has been active since the first time, wherein determining whether at least one of the first or second task has been active since the first time is in response to the watchdog check signal being asserted at the second time; and
   in response to determining that at least one of the first or second task has been active since the first time, asserting an error indicator.

2. The method of claim 1, wherein the watchdog check signal is asserted periodically.

3. The method of claim 2, further comprising:
   programming a period of the watchdog timer from a task other than the first or second task.

4. The method of claim 1, wherein the first and second task are assigned to a same core of the data processor.

5. The method of claim 1, wherein the first and second task are assigned to different cores of the data processor.

6. The method of claim 1, wherein:
   the first indicator indicates the state of the first task is active at the first time; and
   independent of a state of the watchdog check signal, updating the first indicator to indicate the state of the first state is inactive in response to the state of the first task becoming inactive subsequent to the first time and prior to the second time.

7. The method of claim 1 further comprising:
   in response to determining that neither the state of the first nor second task is active at the second time, not asserting the error indictor.

8. The method of claim 7 further comprising:
   in response to determining that neither the first nor second task is active, updating, in response to the watchdog check signal being asserted at the second time, the first state indicator to indicate whether the state of the first task at the second time is active or inactive, and updating the second state indicator to indicate whether the state of the second task at the second time is active or inactive.

9. The method of claim 1, wherein each task of a plurality of tasks, which includes the first task and the second task, is active in response to being assigned to a particular core of the data processor.

10. The method of claim 1, wherein the first indicator is stored at a first storage location, and a core executing the first task cannot write an indicator to the first storage location that indicates the first task is inactive.

11. The method of claim 1, wherein the first indicator is stored at a first storage location, the second indicator is stored at a second storage location, and a core executing the first task cannot store a value to either the first or second storage locations.

12. The method of claim 1, wherein the error indicator is further asserted in response to a watchdog function being enabled.

13. A data processor device comprising:
   a task scheduler configured to assign a plurality of tasks to a corresponding plurality of task identifiers;
   a task state tracker configured to generate a state indicator for each one of the plurality of tasks that indicates whether a task is active or inactive;
   a watchdog status register having a plurality of storage locations, each storage location to store a task identifier of a corresponding one of the plurality of tasks;
   a watchdog check circuit configured to generate a watchdog check signal that is periodically asserted;
   watchdog monitor circuit, coupled to the watchdog status register, to the watchdog check circuit, and to the task state tracker, that is configured to assert each storage location of the plurality of storage locations corresponding to a task having an active state indicator at the time the check signal is asserted, and to negate each storage location of the plurality of storage locations corresponding to a task having an inactive state indicator at the time the check signal is asserted, and
   error detect circuitry, coupled the watchdog status register and to the watchdog check circuit, configured to generate a watchdog error in response one or more of the plurality of storage locations being asserted at the time the check signal is asserted.

14. The device of claim 13, wherein the watchdog monitor circuit configures each storage location in response to a watchdog error not being generated by the error detect circuitry.

15. The device of claim 13 further comprising:
   a plurality of cores including a first core and a second core, a first portion of the plurality of tasks assigned to the first core, and a second portion of the plurality of tasks assigned to the second core.

16. The device of claim 13 further comprising:
   a programmable check signal register coupled to the watchdog check circuit to indicate a period of the check signal to be implemented by the watchdog check circuit.

17. The device of claim 13 wherein the task state tracker generates a state indicator that indicates a task is active synchronously with the check signal being asserted, and generates a state indicator that indicate a task is inactive asynchronously with the check signal.

18. A method comprising:
   in response to receiving an asserted watchdog check signal at a first time, storing a first indicator at a first storage location that indicates the first task of a data processor is active at the first time;
   receiving a negated watchdog check signal at a second time that is contiguous to, and after, the first time;
   in response to the watchdog check signal being asserted at a third time that is contiguous to, and after, the second time, asserting a watchdog error indicator in response to determining that the first indicator is stored at the first storage location.

19. The device of claim 18 further comprising:
   storing a duration indicator;
   asserting the second watchdog check signal at the third time relative to the first time based upon the stored duration indicator.

* * * * *